(12) United States Patent
Jurca

(10) Patent No.: US 8,676,650 B1
(45) Date of Patent: Mar. 18, 2014

(54) ALLOCATING AND PRICING GEO-LOCATED ADVERTISEMENTS FOR DISPLAY ON MAPS

(75) Inventor: Radu Jurca, Adliswil (CH)

(73) Assignee: Google Inc., Mountain View, CA (US)

( * ) Notice: Subject to any disclaimer, the term of this patent is extended or adjusted under 35 U.S.C. 154(b) by 227 days.

(21) Appl. No.: 13/211,119

(22) Filed: Aug. 16, 2011

(51) Int. Cl.
*G06Q 30/00* (2012.01)
*G06Q 30/02* (2012.01)

(52) U.S. Cl.
CPC ........ *G06Q 30/0275* (2013.01); *G06Q 30/0259* (2013.01)
USPC ..................................... 705/14.71; 705/14.57

(58) Field of Classification Search
USPC .......................................... 705/14.71, 14.57
See application file for complete search history.

(56) References Cited

U.S. PATENT DOCUMENTS

| | | | |
|---|---|---|---|
| 7,050,990 B1 * | 5/2006 | Chu et al. .................... | 705/14.71 |
| 7,983,949 B1 * | 7/2011 | Joseph et al. .............. | 705/14.57 |
| 8,249,930 B2 * | 8/2012 | Badger et al. ................ | 705/14.4 |
| 2009/0006190 A1 * | 1/2009 | Lucash et al. ................... | 705/14 |
| 2009/0012865 A1 * | 1/2009 | Celik .............................. | 705/14 |
| 2009/0254414 A1 * | 10/2009 | Schwarz et al. ................ | 705/10 |

* cited by examiner

*Primary Examiner* — James W Myhre
(74) *Attorney, Agent, or Firm* — Fenwick & West LLP

(57) ABSTRACT

In one embodiment, a map server provides online maps with advertisements corresponding to map features included in the online maps. The map server holds an auction to determine which advertisers can display their associated advertisements in an online map. In one embodiment, the map server selects which advertisers with collocated advertisements in the online map can display their advertisements and calculates a price paid by the selected advertisers for the display of the advertisements.

37 Claims, 4 Drawing Sheets

ALLOCATING AND PRICING GEO-LOCATED ADVERTISEMENTS FOR DISPLAY ON MAPS

TECHNICAL FIELD

The embodiments disclosed herein generally relate to advertising. More particularly, the embodiments herein relate to allocating advertisements for display on online maps and determining pricing for the display of the allocated advertisements.

BACKGROUND

Online maps provide advertising opportunities for businesses represented on the maps. Visual advertisements may be included in online maps for display to end users. Including a visual advertisement of a business on an online map is beneficial compared to simply including a textual label for the business because the advertisement creates a branding effect that users associate with the business. However, because screen real-estate in online maps is limited, simply displaying advertisements for all businesses represented on the online maps may degrade the usefulness of online maps by cluttering the maps with excess information.

SUMMARY

The embodiments herein generally describe mechanisms for allocating and pricing advertisements for display on online maps using an auction system, where the advertisements are displayed on the map proximate to specific geographic locations; advertisements displayed in this manner are described as "geo-located." In one embodiment, a map server receives bids from advertisers for advertisements for display on online maps provided by the map server. Each bid also includes a bid (declared) price that the advertiser is willing to pay for the display of its advertisement on the online maps, where the advertisement is to be displayed proximate to an associated geographic location (e.g., an address). Typically, the advertisers want the advertisements displayed on the maps at locations proximate to the locations of businesses associated with the advertisements.

Generally, the map server determines which advertisers (i.e., winning advertisers) will have their advertisements included in an online map based on the bid prices and presentation costs associated with the advertisements. In one embodiment, the map server identifies which advertisements are displayed in the online map based on the user query. The map server may select a subset of advertisements that can be displayed in the online map based on the context of the query. In some cases, certain advertisements cannot be simultaneously displayed in an online map. For example, multiple advertisers may have advertisements that would visually overlap on the map if displayed at the same time, for example, where multiple businesses operate at the same location (e.g., at a shopping mall) or in close proximity to each other. The map server determines which advertiser will have its advertisement displayed in such circumstances, based on the bid prices submitted by each advertiser, as well as a presentation cost of including each advertisement in the online map. In one embodiment, the presentation cost describes the visual impact of including the advertisement in the online map and is based on the amount of overlap between the advertisement and map features on the map (e.g., buildings, streets, labels, etc.). Based on the bid price and presentation cost for each advertisement, the map server selects which collocated advertisement to include in the online map. Thus, the selected advertisement(s) represents an advertisement that maximizes the bid price from the advertisers with a minimal presentation cost in terms of map degradation.

In one embodiment, the map server calculates the price that each winning advertiser pays to display an associated advertisement in the online map. The map server may calculate the price to charge each winning advertiser based on the bid prices that the other winning advertisers are willing to pay to display their advertisements and presentation costs for including the other advertisements in the online map. Typically, the price that each winning advertiser pays to display an advertisement on the online map is less than the bid price provided by the advertiser. In one embodiment, the price that each winning advertiser pays is always below the bid price provided by the advertiser. This offers an incentive for advertisers to participate in the auction since the amount each advertiser pays to display their advertisements is less than the value of the advertisement as perceived by the advertiser.

The features and advantages described in this summary and the following detailed description are not intended to be limiting. Many additional features and advantages will be apparent to one of ordinary skill in the art in view of the drawings, specification and claims.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
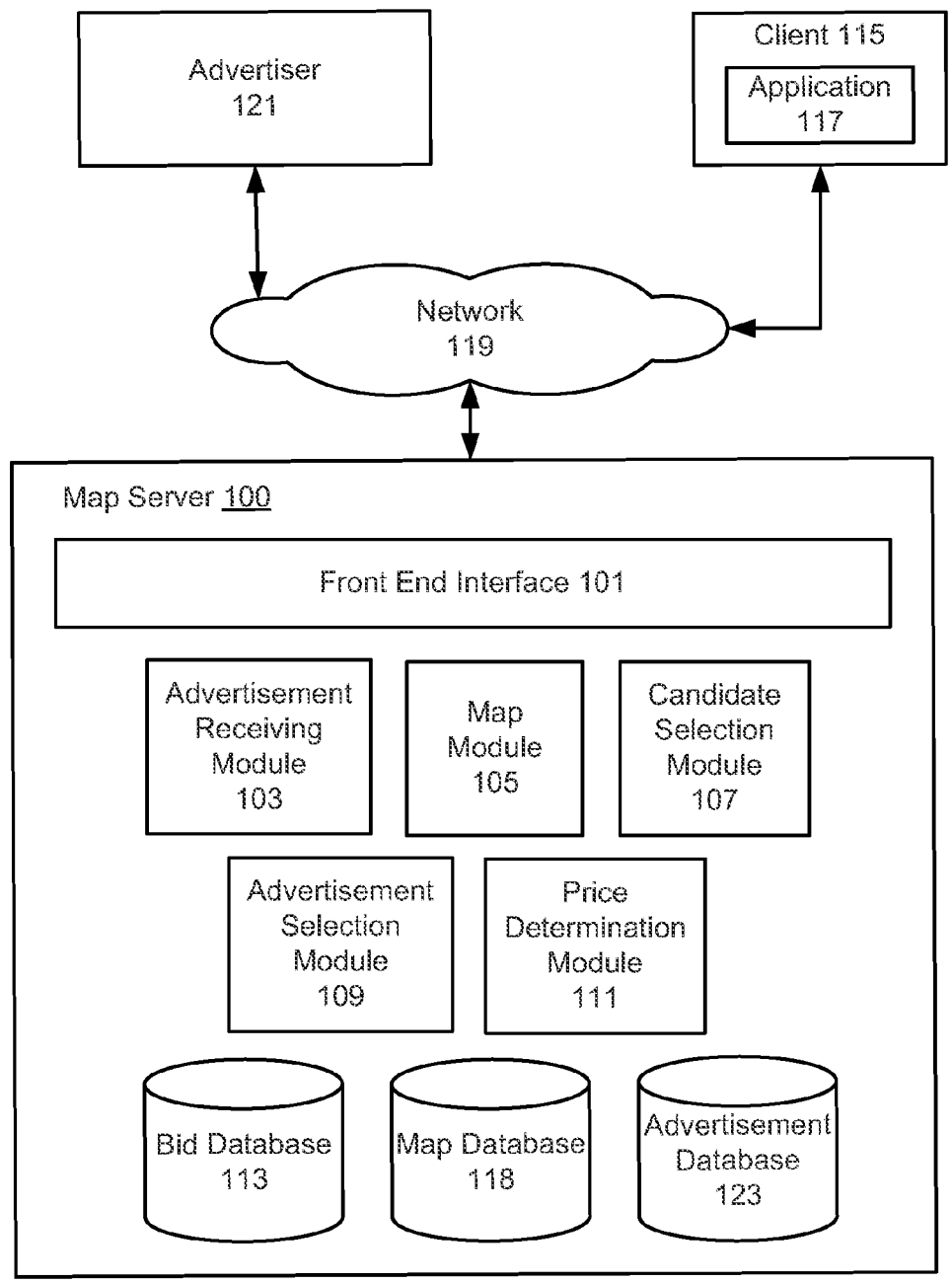
FIG. 1 illustrates a system architecture of a map server according to one embodiment.

FIG. 1 illustrates a system architecture of a map server 100 that allocates and prices geo-located advertisements for display in online maps in accordance with one embodiment. Generally, by way of background, an online map displayed at a user's client device may include a plurality of map features, including businesses. The operators of such businesses represented in the online map have an interest in having geo-located advertisements displayed on the online map proximate to the locations corresponding to the businesses.

To prevent the online map from being cluttered with too many geo-located advertisements, the map server 100 uses an auction system in which advertisers submit bids to display associated advertisements in the online map, as will be further described below. In response to a user query for an online map, the map server 100 generates the online map that satisfies the query and identifies a set of advertisers having advertisements that are associated with businesses which are represented in the generated map. The map server selects which advertisers (i.e., winning advertisers) from the set of available advertisers will have their advertisements included in the map based on the provided bid and presentation cost associated with each advertisement.

The map server 100 uses a second price auction to calculate a price paid by each winning advertiser for the display of an associated advertisement in the online map. The price paid by each winning advertiser for the display of their advertisement is less than the bid price supplied by the advertiser. This provides incentive to advertisers to participate in the auction since advertisers will pay less than the advertiser's perceived value (i.e., utility) of the advertisements.

As shown in the embodiment of FIG. 1, the map server 100 includes a front end interface 101, an advertisement receiving module 103, a map module 105, a candidate selection module 107, an advertisement selection module 109, a price determination module 111, a bid database 113, a map database 118, and an advertisement database 123. Each of these modules and databases is described in further detail below. Many conventional features, such as firewalls, load balancers, application servers, failover servers, site management tools and so forth are not shown so as not to obscure the features of the system.

In one embodiment, a suitable website for implementation of the map server 100 is the GOOGLE™ Maps website, found at maps.google.com. Other map sites are known as well, and can be adapted to operate according to the teaching disclosed herein. The term "website" represents any computer system adapted to serve content using any networking protocol, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

In one embodiment, the map server 100 is implemented as server program executing on server-class computer comprising a CPU, memory, network interface, peripheral interfaces, and other well known components. In one embodiment, the computers themselves run an operating system such as LINUX, Microsoft Windows, or Mac OS X, have generally high performance CPUs, 2G or more of memory, and 1TB or more of disk storage. Of course, other types of computers can be used, and it is expected that as more powerful computers are developed in the future, they can be configured in accordance with the teachings here. The functionality implemented by any of the elements can be provided by computer program products (e.g., as computer executable instructions) that are stored in non-transitory computer-readable storage mediums (e.g., RAM, hard disk, or optical/magnetic media).

In one embodiment, and as shown in FIG. 1, a client 115 executing an application 117 or connects to the map server 100 to allow a user to view online maps provided by the map server 100. The client 115 may connect to the map server 100 via a network 119 such as the Internet or any combination of a LAN, a MAN, a WAN, a mobile, wired or wireless network, a private network, or a virtual private network. While only a single client 115 is shown in FIG. 1, in general very large numbers (e.g., millions) of clients 115 are supported and can be in communication with the map server 100 at any time. In one embodiment, the client 115 can be implemented using any of a variety of different computing devices, some examples of which are personal computers, digital assistants, personal digital assistants, cellular phones, mobile phones, smart phones and laptop computers.

The application 117 is any application that allows users of clients 115 to access content, such as web pages, via the Internet. Suitable applications include, but are not limited to browsers such GOOGLE CHROME, MICROSOFT INTERNET EXPLORER, NETSCAPE NAVIGATOR, MOZILLA FIREFOX, and APPLE SAFARI. The application 117 may also be a dedicated application that provides online maps, such as map reader, navigation application, check-in application, recommendations application, or the like. The application 117 allows the user of client 115 to access websites comprising online maps provided by the map server 100 via a user interface provided by the front end interface 101. Through the interface 101, a user can view online maps provided by the map server 100.

The map server 100 receives bids from advertisers 121 via network 119. As mentioned previously, the bids are for including geo-located advertisements in online maps provided by the map server 100. While only a single advertiser 121 is shown in FIG. 1, in general very large numbers of advertisers 121 are supported and can be in communication with the map server 100 at any time. In one embodiment, advertisers 121 represent commercial advertisers that create advertisements for businesses. Alternatively, advertisers 121 signify businesses that are represented on online maps provided by the map server 100. These businesses may function as advertisers by providing bids to the map server 100 to include their advertisements in online maps.

In one embodiment, each geo-located advertisement provided by advertiser 121 is associated with a business having a specific geographic location (e.g., the street address or geospatial coordinates), and which would appear as a map feature on an online map. The advertiser 121 provides the advertisement for display at a location on the online map that corresponds to the geographical location of the business that is associated with the advertisement. The geo-located advertisements provided by advertiser 121 comprise graphical elements such as windows, icons, buttons, flags, or the like that include indicia related to the businesses, such as brand logos, trade names, or trademarks of businesses. By placing business related indicia or other advertisements of businesses at each business' respective location in an online map, the advertisements serve as visual cues to end users of the online map of the locations of these businesses.

In one embodiment, a bid from an advertiser is associated with an advertisement, a location corresponding to a business that is associated with the advertisement, and the advertiser's bid price that it is willing to pay for the inclusion of the advertisement at the represented geographic location in the online map. The bid price may represent the maximum price that the advertiser 121 is willing to pay to display the advertisement. For example, consider an advertisement for MCDONALDS™. The advertiser 121 may provide:

an advertisement for MCDONALDS™ such as the MCDONALDS'™ logo;
a bid price that the advertiser 121 is willing to pay for the display of the advertisement such as $2.00; and
a geographical location represented on the map at which to display the advertisement for the bid price such as "600 Showers Dr, Mountain View, Calif., USA."

Map Server

As shown in FIG. 1, the map server 100 comprises an advertisement receiving module 103. The advertisement receiving module 103 receives bids from advertisers 121. The advertisement receiving module 103 stores the received bids including information identifying the advertisements, bid prices, and locations associated with the bids in the bid database 113. A bid may be received as a unitary data (e.g., the advertisement, price, and location combined into a common data object), or as individual separate parts related to either other by references or links. The advertisements may also be concurrently stored in the bid database 113 or in a separate advertisement database 123 as shown in FIG. 1 for improved system performance.

In one embodiment, the bid database 113 stores an inventory of bids received from multiple different advertisers 121. The bids stored in the bid database 113 represent advertisements that businesses want included on online maps at the location of the businesses that are associated with the advertisements. Below is a simplified representation of the inventory of bids stored in the bid database 113.

| Example Table of Bids | | | |
|---|---|---|---|
| Advertiser | Advertisement | Location For Advertisement | Price |
| $a_1$ | "Brindisi Cucina Di Mare" | 88 Belden Pl, San Francisco, CA | $5.00 |
| $a_2$ | "Trademark American Grill" | 86 Belden Pl, San Francisco, CA | $2.00 |
| $a_3$ | "B44" | 44 Belden Pl, San Francisco, CA | $1.00 |
| $a_4$ | "Baladie Cafe" | 337 Kearny, San Francisco, CA | $3.00 |
| $a_5$ | "Café Bastille" | 22 Belden Pl, San Francisco, CA | $4.00 |

As shown above, each record (row) in the bid database 113 corresponds to an advertiser $a_i$, the advertisement provided by the advertiser $a_i$, a location represented on the online map in which to display the advertisement, and a bid price the advertiser $a_i$ is willing to pay to include the advertisement at the location in online maps. For example, as shown above, advertiser $a_1$ is willing to pay $5.00 to include the advertisement for "Brindisi Cucina Di Mare" at the location on an online map corresponding to 88 Belden Pl, San Francisco, Calif. In practice a given advertiser can provides any number of bids for advertisements at various different locations, for example for each of its stores.

The map database 118 stores map information associated with map features that are displayed on online maps. The map information defines parameters used to render map features included in online maps. In one embodiment, a map feature represents a real world object that can be represented in an online map such as businesses, roads, and buildings. Map features also represent countries, provinces, islands, states, bodies of water, cities, natural features (e.g., mountain ranges), etc.

Map features may be associated with boundaries that define the location of the map features. For example, a business may be represented by a boundary corresponding to the building in which the business is located. In one embodiment, a boundary is represented as a series of points that form a closed polygon. Each point of a boundary corresponds to a geospatial identifier such as a latitude and longitude coordinate. A map feature may be also associated with a geospatial identifier that corresponds to the geographical location of the map feature such as a business' address.

The map module 105 is any web-based application known in the art that provides online maps to users. Exemplary web-based applications include GOOGLE Maps. The map module 105 utilizes the map information in the map database 118 to generate two-dimensional and/or three-dimensional digital maps and populate the maps with map features.

In one embodiment, the map module 105 receives from a user of client 115 a request for an online map. The request may include a name of a map feature (e.g., a city, neighborhood, business, etc.) and/or an address associated with the map feature. The map module 105 identifies the relevant map information from the map database 118 and generates an online map that fulfills the user's request. The map module 105 transmits to the client 115 the online map including the geo-located advertisements of selected advertisers 121 that won the auction for having their advertisements displayed in that particular online map, as will be described in further detail below. Alternatively, rather than constructing the online map at the map system 100, the map module 105 transmits the online map, map information, and a set of selected geo-located advertisements to the client 115 which then constructs the map for presentation to user.

Figure 2A:
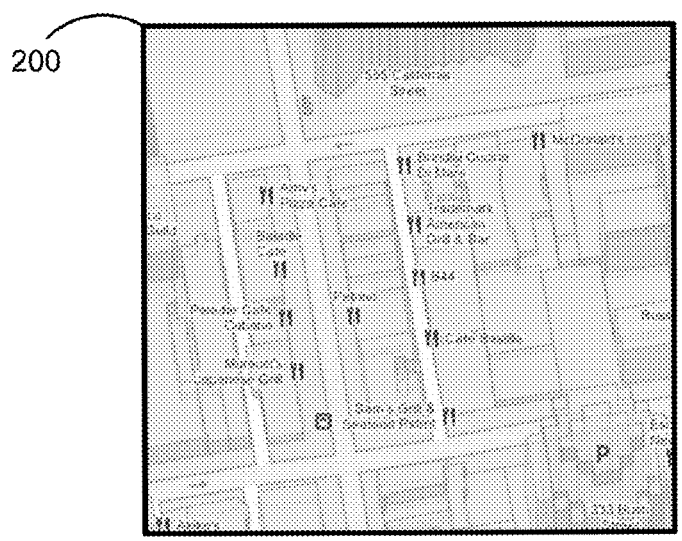
FIGS. 2A-2D illustrate representations of advertisements displayed on an online map according to one embodiment.

FIG. 2A illustrates one example of an online map 200 generated by the map module 105 that illustrates a portion of the financial district of San Francisco, Calif. As shown in FIG. 2A, initially the online map 200 lacks geo-located advertisements. The online map 200 is generated by the map module 105 in response to a query associated with the geographical area shown in online map 200. The user may have submitted the query designating a geographical area such as "Financial District, San Francisco" or a name of a business such as "Brindisi Cucina De Mare." As shown in FIG. 2A, the online map 200 illustrates the location of various restaurants (map features) such as Brindisi Cucina Di Mare, Trademark American Grill & Bar, B44, Café Bastille, Sam's Grill & Seafood Restaurant, and McDonalds.

Candidate Advertiser Selection

Referring back to FIG. 1, the candidate selection module 107 identifies candidate advertisements for display in an online map. Specifically, the candidate selection module 107 identifies advertisers that have candidate advertisements associated with the context of a user's request for an online map. In one embodiment, the context of a request is based on the map viewport of the map generated by the map server 100. The map viewport defines the area of the online map that will be viewed by the user of client 115. For example, in FIG. 2A the rectangular border of map 200 represents the viewport of the map 200.

The candidate selection module 107 identifies advertisers with candidate advertisements to display in an online map using the location information associated with each advertisement. More particularly, the candidate selection module 107 identifies which advertisers have advertisements that are associated with a location that is viewable within the map viewport of client 115, based on the location information provided with each advertisement. This can be done by comparing the geographic locations associated with the advertisements with the geographic boundaries of the viewport. The set of advertisers A having candidate advertisements for display in the generated map may be represented as A={$a_1 \ldots a_n$})

Figure 2B:
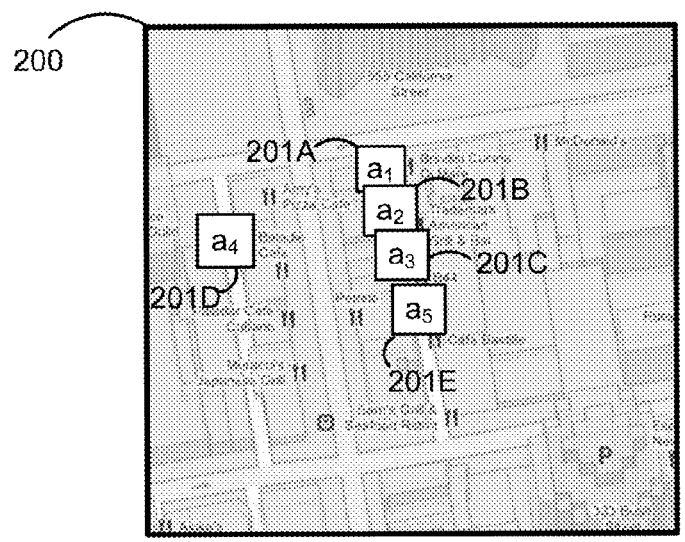

For example, FIG. 2B illustrates a set of candidate advertisements 201A-201E from the bid database 113 that are associated with restaurants Brindisi Cucina Di Mare, Trademark American Grill & Bar, B44, Café Bastille, and Baladie Café shown in the online map 200. Although other establishments are included in the online map 200, advertisements associated with these establishments may not have been provided to the map server 100. In this example, the set of candidate advertisers A for online map 200 is A={$a_1, a_2, a_3, a_4,$ and $a_5$) which describes the advertisers that have candidate advertisements for display in the online map 200. FIG. 2B illustrates the position of each advertisement 201 in online map 200 if all five advertisements were included in the map 200. Generally, the center of each advertisement 201 is located on the online map 200 proximate to the address of the businesses corresponding to the advertisement. As can be seen in FIG. 2B, several of the geo-located advertisements are crowded very close together, some overlapping in part, since the underlying addresses for the advertisements are very close together. This results in cluttered appearance, and obscures some of the underlying information in the map itself. Accordingly, the map server 100 selects a subset of these geo-located advertisements for display.

In one embodiment, the candidate selection module 107 determines a presentation cost $c_i$ to display each candidate advertisement in the online map. The presentation cost $c_i$ of an advertisement from advertiser $a_i$ describes the visual impact on an online map by including the advertisement in the map.

Generally, the presentation cost $c_i$ increases when the advertisement obstructs important information on the online map. Examples of items that can be obstructed by an advertisement include map labels, legends, building, roads, mapping tools, or any map features that would be less visible due to the display of the advertisement and/or cluttering of the online map. The presentation cost is reduced when the display of the advertisement enhances the experience of the user. For example, displaying advertisements in unpopulated areas of the online map or advertisements that are helpful for navigation of the online map are examples of advertisements that enhance the user experience thereby resulting in a reduced presentation cost.

The presentation cost $c_i$ to display a candidate advertisement from advertiser $a_i$ is based at least in part on how much the advertisement obstructs other map features in the online map. In one embodiment, the presentation cost $c_i$ is based on the amount of overlap between the advertisement and other map features in the online map. For example, in FIG. 2B consider the advertisement 201E from advertiser $a_5$. The candidate selection module 107 calculates the presentation cost $c_5$ for advertisement 201E based on how much advertisement 201E overlaps the building that represents the restaurant of Café Bastille, the street in which the restaurant is located, the label of the restaurant, and/or any of the other map features in the online map 200.

To determine the presentation cost $c_i$ of an advertisement from advertiser $a_i$, the candidate selection module 107 identifies the position in which the advertisement will be displayed in the online map. In one embodiment, the candidate selection module 107 identifies the center of the bounding box of the advertisement in terms of pixel coordinates. The center of the bounding box of an advertisement is typically placed in the online map at the coordinates that correspond to the location of the business associated with the advertisement. Based on the coordinates that define the bounding box of the advertisement and the coordinates of the building of the business, the candidate selection module 107 calculates the amount of overlap between the advertisement and the building. The amount of overlap can be based on either maximal linear overlap (e.g., the greater of a horizontal or vertical overlap), or total area (e.g., height×width) of overlap. Based on the amount of overlap, the candidate selection module 107 calculates the presentation cost $c_i$ to display the advertisement on the online map. In one embodiment, the presentation cost $c_i$ equals the overlap amount.

In one embodiment, the presentation cost $c_i$ of a candidate advertisement may also be weighted based on the type of map feature that the advertisement overlaps. Overlapping particular types of map features may increase the presentation cost $c_i$ to display the advertisement compared to overlapping other types map features. For each of a number of different types of map features, such as points of interest, buildings, parks, lakes, mountains, open spaces, and so forth, a weight is determined which is used to increase (or decrease) the presentation cost for overlapping that type of feature. For example, if the map feature is a point of interest, such as a statue, overlapping the point of interest map feature may be weighted more than if the advertisement overlapped a residence feature which is associated with a lower weight. The weights for each for each type of map feature being overlapped are set by the system designer, as desired.

Winning Advertisement(s) Selection

Referring back to FIG. 1, the advertisement selection module 109 selects which advertisement(s) from the set of candidate advertisements to include in the online map. In one embodiment, some groups of advertisements from the set of candidate advertisements cannot be simultaneously displayed on the online map. For example, only one of several advertisers can have his or her advertisement displayed at a certain location if the advertisers all have advertisements that are collocated. In one embodiment, collocated advertisements are advertisements that are associated with substantially the same location or with locations that are proximate to each other (e.g., within a threshold distance from one another in the online map). The threshold for determining collocated advertisements may be based on the graphical size of the advertisements (e.g., dimensions in pixels), as well as the resolution (zoom, level of detail) of the map. Thus, at a high resolutions ("zoomed in") the geographical distance threshold may be decreased, since the reduced map scales allows for more advertisements to be placed within a given area. Conversely, at lower resolutions ("zoomed out"), the geographical distance threshold may be increased, reducing the number of advertisements that can be shown for a given area.

Displaying collocated advertisements on the online map would overly clutter the map and may obstruct important map information on the map. Such a constraint is represented by the following relation:

$$R=\{(a_i,a_j)|a_i,a_j \in A\}$$

The above relationship R describes the set of all pairs of advertisers $(a_i, a_j)$, such the advertisement of advertiser $a_i$ and the advertisement of advertiser $a_j$ cannot coexist on the map at a common location. Additionally, the online map should not include more than a threshold number $\gamma$ of advertisements. In one embodiment, the advertisement selection module 109 derives $\overline{R}$ from R. $\overline{R}$ describes the set of all pairs of advertisers that can coexist on the map at a common location. The advertisement selection module 109 uses the constraint relationship $\overline{R}$ or R to respectively determine which advertisements can placed on the map at the same time or which advertisements cannot simultaneously placed on the map.

Figure 2D:
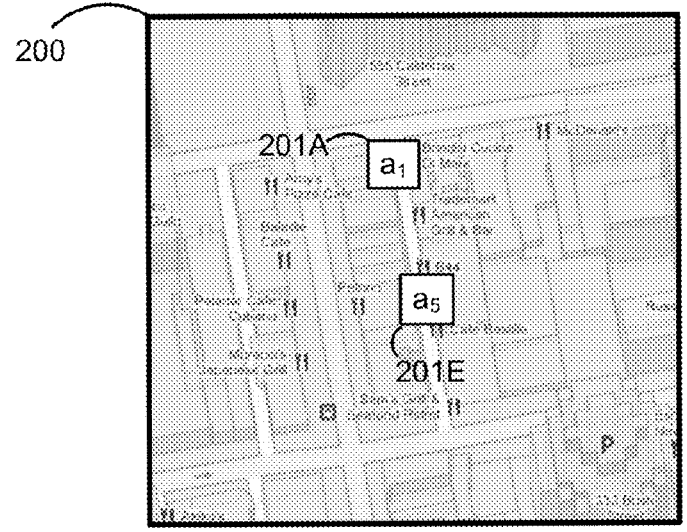
Figure 2C:
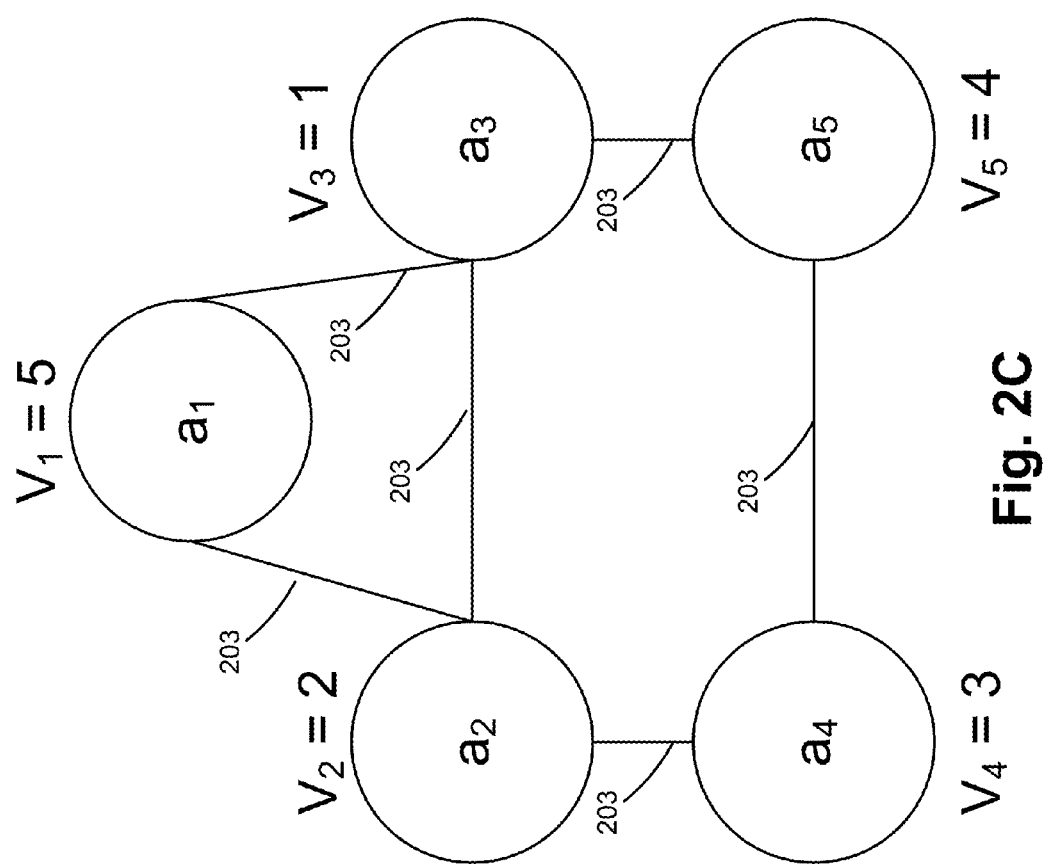

In one embodiment, advertisements in conflict with one another according to relationship R can be represented by a conflict graph comprising advertisers A. The conflict graph illustrates constraints between mutually exclusive advertisements through arcs connecting the respective advertisers in the graph. For example, FIG. 2C illustrates a conflict graph between the advertisers from FIG. 2B that are associated with online map 200. As shown in FIG. 2C, pairs of advertisers $(a_i, a_j)$ are connected to one another through arcs 203. Connected advertisements (i.e., neighbors) are mutually exclusive and cannot be simultaneously displayed on the online map because they are all collocated in a similar area. Displaying these advertisements would result in over cluttering of the online map. In this example, the advertisements of advertisers $a_1$, $a_2$, and $a_3$ are collocated so only one of their advertisements can be displayed. Similarly, advertisements from advertisers $a_2$ and $a_4$ are collocated so only one of their advertisements can be displayed. Additionally, advertisements from advertisers $a_3$ and $a_5$ are collocated so only one of their advertisements can be displayed. The relationship M of mutually exclusive advertisers for the online map in the example shown in FIG. 2C is modeled by the following:

$$M=\{(a_1,a_2),(a_2,a_3),(a_1,a_3),(a_2,a_4),(a_3,a_5)\}$$

The above relationship indicates the pairs of advertisements that cannot be simultaneously displayed in the online map. Thus, the relationship indicates the mutually exclusive advertisements associated with online map 200. FIG. 2C also indicates the bid price that each advertiser $a_i$ is willing to pay to display their advertisements in online map 200. For example, advertiser $a_1$ is willing to pay $5.00 to display the associated advertisement whereas advertisers $a_2$, $a_3$, $a_4$, and $a_5$ are respectively willing to pay $2.00, $1,00, $3.00, and $4.00 to display their respective advertisements.

In one embodiment, the advertisement selection module 109 selects a subset of advertisers $\overline{A}$ from advertisers A ($\overline{A} \in A$) such that all advertisers in $\overline{A}$ satisfy the constraints expressed by relationship $\overline{R}$ previously described above. By satisfying the constraints, the advertisement selection module 109 selects advertisements that maximize the welfare of the advertisers that are participating in the auction. In one embodiment, the welfare of the advertisers is based on the declared value $v_i$ (i.e., bid price) that each advertiser is willing to pay for the advertisements minus the presentation cost $c_i$ associated with including each candidate advertisement on the online map. A relationship for selecting the winning advertisers can be represented as:

$$\max_{A \subseteq A} \sum_{a_i \in \overline{A}} (v_i - c_i) \text{ such that} \quad (1)$$

$$\forall (a_i, a_j) \in \overline{A}, (a_i, a_j) \in \overline{R} \quad (a)$$

$$|\overline{A}| \leq \gamma \quad (b)$$

In the above relationship, the first constraint (a) only allows pairs of advertisers ($a_i$, aj) included in the set of winning advertisers $\overline{A}$ that have advertisements that satisfy relationship $\overline{R}$. The second constraint (b) limits the number of winning advertisers to the threshold $\gamma$ of advertisers that can display advertisements on the online map.

For example, consider the advertisers having candidate advertisements for the online map 200 shown in FIG. 2 and assume that the presentation cost for each advertisement is zero for simplicity purposes. Also, assume that the number of advertisers $\gamma$ that can display advertisements on the online map is two. Given the above constraints in relationship (1), the four subsets of advertisers $a_i$ that can simultaneously display advertisements in the online map 200 are:

- $a_1$ and $a_4$ with a total welfare of: $[v_1-c_1]+[v_4-c_4]=[5-0]+[3-0]=8$;
- $a_1$ and $a_5$ with a total welfare of: $[v_1-c_1]+[v_5-c_5]=[5-0]+[4-0]=9$;
- $a_2$ and $a_5$ with a total welfare of: $[v_2-c_2]+[v_5-c_5]=[2-0]+[4-0]=6$; and
- $a_3$ and $a_4$ with a total welfare of: $[v_3-c_3]+[v_4-c_4]=[1-0]+[3-0]=4$.

In the above example, the advertisement selection module 109 determines that the set of winning advertisers $\overline{A}$ is equal to $\{a_1, a_5\}$ because this pair of advertisers maximizes the declared value $v_i$ that the advertisers $a_i$ are willing to pay to display advertisements on the online map 200 minus the presentation cost $c_i$ to display the advertisements in the online map. Referring now to FIG. 2D, the online map 200 includes advertisements from winning advertisers $a_1$ and $a_5$ that correspond to the restaurants of Brindisi Cucina Di Mare and Café Bastille. The displayed advertisements represent the advertisements that maximize the bid price from the advertisers with a minimal presentation cost in terms of map degradation. The advertisement selection module 109 communicates the winning advertisements to the map module 105 for transmission to client 115 with the online map.

In one embodiment, the advertisement selection module 109 represents the relationship for selecting the winning advertisers as an integer linear problem. The advertisement selection module 109 introduces a vector of binary variables into the relationship (1) previously described above. In one embodiment, the vector of binary variables is represented as follows:

$x=(x_1, x_2, \ldots x_n)$ where:

$x_i=0$ if advertiser $a_i$ is not in the winning set of advertisers $\overline{A}$; and $x_i=1$ if advertiser $a_i$ is in the winning set of advertisers $\overline{A}$.

The welfare corresponding to the set of winning advertisers $\overline{A}$ can be expressed as:

welfare=$x \cdot (v-c)^T$

In the above expression, the welfare of the set of winning advertisers A is the product of x and the transpose of the difference vector (v–c), where $v=(v_1, \ldots v_n)$ which represents the declared value $v_i$ that the advertisers in the set $\overline{A}$ are willing to pay to display their respective advertisements and $c=(c_1, \ldots c_n)$ which represents the presentation cost $c_i$ to display each candidate advertisement in the online map.

The constraints of the relationship R can be expressed in terms of the variables $x_i$, such that for any pair of advertisers ($a_i$, $a_j$) in the conflict graph G, their respective binary variables are zero. This can be formally expressed as $(a_i, a_1) \in R$, $x_i \cdot x_j = 0$. The optimization of relationship (1) can therefore be expressed as the following integer linear equation:

$$\max_{x} \sum_{i=1}^{n} x_i \cdot (v_i - c_i) \text{ such that:} \quad (2)$$

$$x_i + x_j \leq 1 \quad (a)$$

$$\forall (a_i, a_j) \in \overline{R} \quad (b)$$

$$\sum_{i=1}^{n} x_i \leq \gamma \quad (c)$$

$$x \text{ is } \{0, 1\} \quad (d)$$

The above optimization maximizes the welfare corresponding to the advertisers associated with the online map such that (a) the summation of any pair of binary variables is less than or equal to one, (b) all pairs of advertisers ($a_i$, $a_j$) that satisfy relationship $\overline{R}$ (i.e., only advertisers $a_i$ included in $\overline{A}$ are considered such that $a_i \in \overline{A}$), (c) the number of binary variables is less than or equal to the threshold amount of advertisements $\gamma$ that can be displayed on the online map, and (d) the value of x is either zero or one depending on whether $a_i$ is not in the set of winning advertisers $\overline{A}$ or is in the set of winning advertisers $\overline{A}$.

In one embodiment, the advertisement selection module 109 uses an integer programming solver, such as CPLEX, to obtain the values for the binary integers that maximizes the relationship (2) described above. Once the binary integers are obtained, the advertisement selection module 109 identifies the set of winning advertisements that produce the maximum welfare based on the values of the binary variables, the declared value $v_i$ for each advertisement, and the presentation cost $c_i$ for each advertisement.

In an alternative embodiment, the advertisement selection module 109 represents the relationship (1) for selecting the winning advertisers as a MAX-weight 2-satisfiablility (2-SAT) problem. Assume again that binary variables $x=(x_1, x_2, \ldots x_N)$ are introduced into relationship (1), but $x_i$ is interpreted as a Boolean value. In the 2-SAT problem, the optimization of relationship (1) is equivalent to the expression in the integer linear relationship (2) except with different constraints as shown below:

$$\max_x \sum_{i=1}^n x_i \cdot (v_i - c_i) \text{ such that:} \quad (5)$$

$$\bigwedge_{(a_i, a_j) \in R} (\neg x_i \vee \neg x_j) \quad (a)$$

In the 2-SAT equation (3), the constraint is such that for each pair of advertisers $(a_i, a_j)$ that satisfies the relationship R (i.e., only advertisers $a_i$ included in $\overline{A}$ are considered such that $a_i \in \overline{A}$), the cross product is taken of not $x_i$ or not $x_j$. The advertisement selection module 109 uses a MAX-SAT solver such as Clone, MaxSatz, SAT4J, or PM2 to maximize the binary integers. Based on the maximized integers, the advertisement selection module 109 identifies the set of winning advertisements that produce the maximum welfare.

Price Determination

Referring back to FIG. 1, the price determination module 111 calculates the price paid by winning advertisers to display their advertisements in the online map. The price paid by a winning advertiser $a_i$ to display an advertisement in the online map is less than the bid price by the winning advertiser $a_i$. In one embodiment, the price paid by the winning advertiser $a_i$ is always less than the bid price by the winning advertiser $a_i$. This provides an incentive for advertisers to participate in the auction since they are charged less money to advertise than the price they are willing to pay to display their advertisements.

In one embodiment, the price paid by each winning advertiser $a_i$ to display his or her advertisement in an online map is based on (1) the welfare obtained by all other winning advertisers $a_j$ in the auction where the winning advertiser $a_i$ is not present in the auction and (2) the welfare obtained by other winning advertisers $a_j$ in the auction except each winning advertiser $a_i$ when the winning advertiser $a_i$ is present in the auction. Thus, the price paid by each winning advertiser $a_i$ reflects the harm caused by the winning advertiser's presence to the other winning advertisers $a_j$ in the auction.

In one embodiment, the price paid by a winning advertiser $a_i$ is calculated according to the following variables:

$A^{-i} = A \setminus \{a_i\}$: describes the set of all advertisers in the auction except for winning advertiser $a_i$; and $\overline{A}^{-i}$: describes the set of winning advertisers if winning advertiser $a_i$ is not participating in the auction.

The relationship of these variables to each other to determine a price $p_i$ paid by a winning advertiser $a_i$ in an exemplary embodiment is represented by the equation as follows:

$$p_i = \sum_{a_j \in \overline{A}^{-i}} (v_j - c_j) - \sum_{a_j \in \overline{A}, a_j \neq a_i} (v_j - c_j) \quad (4)$$

In the price equation (4) shown above, the first sum describes the total welfare of the winning advertisers if the auction is conducted without the winning advertiser $a_i$. Thus, if the winning advertiser $a_i$ is not included in the auction, a different set of winning advertisers is declared for the auction. Accordingly, the price determination module 111 calculates the welfare in the first sum of the different set of winning advertisers. The second sum describes the total welfare of the winning advertisers except winning advertiser $a_i$ when winning advertiser $a_i$ is included in the auction. Thus, the second sum includes the welfare for all other winning advertisers in the set except for winning advertiser $a_i$. Accordingly, for each winning advertiser $a_i$, the price determination module 111 calculates the price $p_i$ paid by that winning advertiser $a_i$ to display his or her associated advertisement on the online map according to the price equation (4) shown above.

With respect to FIG. 2, as mentioned previously the winning advertisers are advertisers $a_1$ and $a_5$. According to the price equation shown above and assuming that presentation cost is equal to 0 for simplicity purposes, the price $p_1$ paid by advertiser $a_1$ to display advertisement 201A on online map 200 is equivalent to:

$$p_1 = [(v_2 - c_2) + (v_5 - c_5)] - [v_5 - c_5]$$

$$p_1 = [(2 - 0) + (4 - 0)] - [4 - 0]$$

$$p_1 = 2$$

As mentioned above, in the price equation (4), the first sum describes the total welfare of the winning advertisers if the auction is conducted without the winning advertiser $a_i$. If advertiser $a_1$ does not participate in the auction, the winning advertisers comprise advertisers $a_2$ and $a_5$ because this pair of advertisers resulted in the highest welfare. The second sum defines the total welfare of all winning advertisers except for the winning advertiser $a_1$ when $a_1$ is present in the auction. Because the auction is limited to two advertisements in this example and the declared value $v_1$ by advertiser $a_1$ is not included in the second sum, the second sum is equivalent to $v_5$. Based on the price equation shown above, advertiser $a_1$ pays $2.00 to display the advertisement 201A associated with Brindisi Cucina De Mare on the online map 200. Note that advertiser $a_1$ was willing to pay $5.00 for the display of the advertisement 201A, but advertiser $a_1$ paid $3.00 less than the bid price to display the advertisement 201A.

Similarly, the price $p_5$ paid by advertiser $a_5$ is equivalent to:

$$p_5 = [(v_4 - c_4) + (v_1 - c_1)] - [v_1 - c_1]$$

$$p_1 = [(3 - 0) + (5 - 0)] - [5 - 0]$$

$$p_1 = 3$$

If advertiser $a_5$ does not participate in the auction, the winning advertisers are advertisers $a_1$ and $a_4$ which is represented in the first sum of the price equation (4) shown above. The second sum defines the total welfare of all winning advertisers except for the winning advertiser $a_5$ when $a_5$ is present in the auction. Because the auction is limited to two advertisements in this example and the declared value $v_5$ by advertiser $a_5$ is not included in the second sum, the second sum is equivalent to $v_1$. Based on the price equation (4), advertiser $a_5$ pays $3.00 to display the advertisement 201E associated with Café Bastille on the online map 200. Note that advertiser $a_5$ was willing to pay $4.00 for the display of the advertisement 201E, but advertiser $a_5$ paid $1.00 less than the bid price to display the advertisement 201E.

Process for Allocating and Pricing Advertisements

Figure 3:
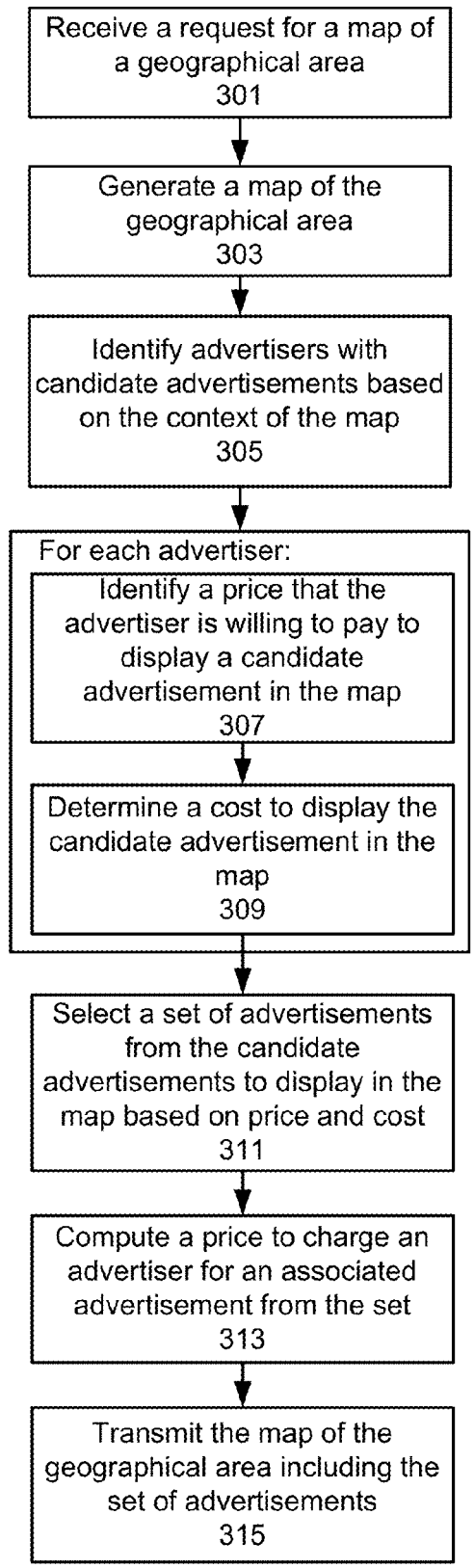
FIG. 3 illustrates a method for allocating and pricing advertisements for display in an online map according to one embodiment.

Referring now to FIG. 3, there is shown one embodiment of a computer-implemented method performed by the map server 100 for allocating and pricing advertisements for display in an online map. Note that in alternative embodiments, other steps may be performed other than those shown in FIG. 3.

In one embodiment, the map server 100 receives 301 a request for a map of a geographical area from client 115. The geographical area indicated in the request may represent a city, neighborhood, street address, etc. The map server 100 generates 303 a map of the geographical area specified in the request. The map server identifies 305 advertisers with candidate advertisements based on the context of the map. In one embodiment, the context describes the map viewport which defines the border of the online map (i.e., the viewable area) that will be viewed by the user of client 115.

For each advertiser, the map server 100 identifies 307 a price that the advertiser is willing to pay to display a candidate advertisement in the map that is associated with the advertiser. Particularly, the price is associated with the display of the advertisement at the location of the business associated with the advertisement. For each advertiser, the map server 100 also determines 309 a presentation cost to display the associated advertisement in the map. The presentation cost describes the impact on the map by including the advertisement in the map.

The map server selects 311 a set of advertisements from the candidate advertisements to display in the map based on the determined price and presentation cost. That is, the map server selects the winning advertisers in the auction that have advertisements for display in the map. The map server 100 computes 313 a price to charge an advertiser for an associated advertisement in the set of selected advertisements. That is, the map server 100 computes how much to charge each winning advertiser to display his or her advertisement in the map. The map server 100 transmits 315 the map of the geographical area including the set of selected advertisements to the client 115 that submitted the request.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

I claim:

1. A computer-implemented method for conducting an auction for selecting advertisements for display in online maps, the method comprising:

generating, by a computer processor, an online map of a geographical area, the online map including map features of the geographical area;

identifying advertisers having candidate advertisements for businesses represented in the geographical area of the online map;

identifying for each advertiser, a bid price that the advertiser is willing to pay to include an associated candidate advertisement in the online map;

calculating, for each candidate advertisement, a presentation cost describing a visual impact on the online map resulting from including the candidate advertisement in the online map, the calculation of the presentation cost based on an amount of overlap of the candidate advertisement with one or more of the map features included in the online map;

selecting a set of advertisements from the candidate advertisements to include in the online map based on the bid price by each advertiser and the calculated presentation cost associated with each candidate advertisement; and storing information describing the online map and the selected set of advertisements.

2. The computer-implemented method of claim 1, further comprising:

for each advertisement from the selected set of advertisements to include in the online map, calculating a price to charge an advertiser associated with the advertisement based on bid prices that other advertisers associated with the selected set of advertisements are willing to pay to display their associated advertisements, and presentation costs associated with the other advertisements in the set, wherein the presentation costs describe an impact on a visual appearance of the online map as a result of including the other advertisements in the online map.

3. The computer-implemented method of claim 2, wherein the calculated price to charge the advertiser is always less than the bid price by the advertiser.

4. The computer-implemented method of claim 1, further comprising:

receiving from each advertiser a bid for the auction, the bid comprising an associated advertisement, a geographic location associated with the advertisement, and the bid price that the advertiser is willing to pay to include the advertisement at the geographic location represented in the online map.

5. The computer-implemented method of claim 1, wherein a plurality of the advertisers have collocated candidate advertisements.

6. The computer-implemented method of claim 5, wherein collocated candidate advertisements are associated with a common geographic location.

7. The computer-implemented method of claim 5, wherein collocated candidate advertisements are associated with geographic locations proximate to each other in the online map.

8. The computer-implemented method of claim 5, wherein selecting the set of advertisements from the candidate advertisements to include in the online map comprises:

determining which advertisements from the collocated candidate advertisements can be displayed together at a geographic location associated the advertisements based on the bid price and the presentation cost associated with each collocated candidate advertisement.

9. The computer-implemented method of claim 1, wherein selecting the set of advertisements is further based on a maximum number of advertisements allowed for inclusion in the online map.

10. The computer-implemented method of claim 1, wherein each of the advertisements in the selected set of advertisements is placed at a location in the online map corresponding to a business associated with the advertisement.

11. The computer-implemented method of claim 10, wherein calculating the presentation cost comprises:

calculating a maximal linear overlap or a total area overlap between each candidate advertisement and the one or more map features.

12. The computer-implemented method of claim 1, wherein the overlap describes a visual overlap between each candidate advertisement and one or more map features.

13. The computer-implemented method of claim 1, wherein the one or more map features comprise at least one of a building, a road, a label, or a point of interest.

14. The computer-implemented method of claim 1, further comprising:

transmitting the online map including the set of selected advertisements to a client that requested the online map.

15. A computer program product comprising a non-transitory computer-readable storage medium containing executable computer program code for conducting an auction for selecting advertisements for display in online maps, the code when executed are for:

generating an online map of a geographical area, the online map including map features of the geographical area;

identifying advertisers having candidate advertisements for businesses represented in the geographical area of the online map;

identifying for each advertiser, a bid price that the advertiser is willing to pay to include an associated candidate advertisement in the online map;

calculating, for each candidate advertisement, a presentation cost describing a visual impact on the online map resulting from including the candidate advertisement in the online map, the calculation of the presentation cost based on an amount of overlap of the candidate advertisement with one or more of the map features included in the online map;

selecting a set of advertisements from the candidate advertisements to include in the online map based on the bid price by each advertiser and the calculated presentation cost associated with each candidate advertisement; and storing information describing the online map and the selected set of advertisements.

16. The computer program product of claim 15, wherein the code when executed is further for:

for each advertisement from the selected set of advertisements to include in the online map, calculating a price to charge an advertiser associated with the advertisement based on bid prices that other advertisers associated with the selected set of advertisements are willing to pay to display their associated advertisements, and presentation costs associated with the other advertisements in the set, wherein the presentation costs describe an impact on a visual appearance of the online map as a result of including the other advertisements in the online map.

17. The computer program product of claim 16, wherein the calculated price to charge the advertiser is always less than the bid price by the advertiser.

18. The computer program product of claim 15, wherein the code when executed is further for:

receiving from each advertiser a bid for an auction, the bid comprising an associated advertisement, a geographic location associated with the advertisement, and the bid price that the advertiser is willing to pay to include the advertisement at the geographic location represented in the online map.

19. The computer program product of claim 15, wherein a plurality of the advertisers have collocated candidate advertisements.

20. The computer program product of claim 19, wherein collocated candidate advertisements are associated with a common geographic location.

21. The computer program product of claim 19, wherein collocated candidate advertisements are associated with geographic locations proximate to each other in the online map.

22. The computer program product of claim 19, wherein the code when executed is further for:
 determining which advertisements from the collocated candidate advertisements can be displayed together at a geographic location associated with the advertisements based on the bid price and the presentation cost associated with each collocated candidate advertisement.

23. The computer program product of claim 15, wherein selecting the set of advertisements is further based on a maximum number of advertisements allowed for inclusion in the online map.

24. The computer program product of claim 15, wherein each of the advertisements in the selected set of advertisements is placed at a location in the online map corresponding to a business associated with the advertisement.

25. The computer program product of claim 15, wherein the overlap describes a visual overlap between each candidate advertisement and one or more map features.

26. The computer program product of claim 15, wherein the code when executed is further for:
 transmitting the online map including the set of selected advertisements to a client that requested the online map.

27. A computer system for conducting an auction for selecting advertisements for display in online maps, the system comprising:
 at least one server computer comprising a computer processor, the computer processor configured to execute instructions stored on a computer-readable storage medium, the instructions when executed by the computer processor cause the processor to:
  generate an online map of a geographical area, the online map including map features of the geographical area;
  identify advertisers having candidate advertisements for businesses represented in the geographical area of the online map;
  identify for each advertiser, a bid price that the advertiser is willing to pay to include an associated candidate advertisement in the online map;
  calculate, for each candidate advertisement, a presentation cost describing a visual impact on the online map resulting from including the candidate advertisement in the online map, the calculation of the presentation cost based on an amount of overlap of the candidate advertisement with one or more of the map features included in the online map;
  select a set of advertisements from the candidate advertisements to include in the online map based on the bid price by each advertiser and the calculated presentation cost associated with each candidate advertisement; and
  store information describing the online map and the selected set of advertisements.

28. The computer system of claim 27, wherein the instructions when executed by the computer processor further cause the processor to:
 for each advertisement from the selected set of advertisements to include in the online map, calculate a price to charge an advertiser associated with the advertisement based on bid prices that other advertisers associated with the selected set of advertisements are willing to pay to display their associated advertisements, and presentation costs associated with the other advertisements in the set, wherein the presentation costs describe an impact on a visual appearance of the online map as a result of including the other advertisements in the online map.

29. The computer system of claim 28, wherein the calculated price to charge the advertiser is always less than the bid price by the advertiser.

30. The computer system of claim 27, wherein the instructions when executed by the computer processor further cause the processor to:
 receive from each advertiser a bid for an auction, the bid comprising an associated advertisement, a geographic location associated with the advertisement, and the bid price that the advertiser is willing to pay to include the advertisement at the geographic location represented in the online map.

31. The computer system of claim 27, wherein a plurality of the advertisers have collocated candidate advertisements.

32. The computer system of claim 31, wherein collocated candidate advertisements are associated with a common geographic location.

33. The computer system of claim 31, wherein collocated candidate advertisements are associated with geographic locations proximate to each other in the online map.

34. The computer system of claim 31, wherein the instructions when executed by the computer processor further cause the processor to:
 determine which advertisements from the collocated candidate advertisements can be displayed together at a geographic location associated with advertisement based on the bid price and the presentation cost associated with each collocated candidate advertisement.

35. The computer system of claim 27, wherein each of the advertisements in the selected set of advertisements is placed at a location in the online map corresponding to a business associated with the advertisement.

36. The computer system of claim 27, wherein the overlap describes a visual overlap between each candidate advertisement and one or more map features.

37. The computer system of claim 27, wherein the instructions when executed by the computer processor further cause the processor to:
 transmit the online map including the set of selected advertisements to a client that requested the online map.

* * * * *